(12) United States Patent
Takano et al.

(10) Patent No.: US 9,042,610 B2
(45) Date of Patent: May 26, 2015

(54) IMAGE PICKUP APPARATUS EQUIPPED WITH FACE-RECOGNITION FUNCTION

(71) Applicant: CASIO COMPUTER CO., LTD., Shibuya-ku, Tokyo (JP)

(72) Inventors: Ryuji Takano, Yamagata (JP); Kenji Iwamoto, Kokubunji (JP)

(73) Assignee: CASIO COMPUTER CO., LTD., Tokyo (JP)

(*) Notice: Subject to any disclaimer, the term of this patent is extended or adjusted under 35 U.S.C. 154(b) by 14 days.

(21) Appl. No.: 14/083,998

(22) Filed: Nov. 19, 2013

(65) Prior Publication Data
US 2014/0078173 A1    Mar. 20, 2014

Related U.S. Application Data

(62) Division of application No. 12/057,753, filed on Mar. 28, 2008, now Pat. No. 8,615,112.

(30) Foreign Application Priority Data

Mar. 30, 2007  (JP) ................................. 2007-092815
Feb. 4, 2008   (JP) ................................. 2008-023980

(51) Int. Cl.
*G06K 9/00*  (2006.01)
*H04N 5/232* (2006.01)
(Continued)

(52) U.S. Cl.
CPC ........ *G06K 9/00302* (2013.01); *H04N 5/23219* (2013.01); *H04N 5/23293* (2013.01); *H04N 2101/00* (2013.01); *G06T 11/00* (2013.01); *G06K 9/00308* (2013.01)

(58) Field of Classification Search
USPC .......................... 382/103, 115–118, 190, 195; 340/5.52–5.54, 5.82–5.84; 348/77, 348/207.99, 222.1; 345/619, 62
See application file for complete search history.

(56) References Cited

U.S. PATENT DOCUMENTS 5,966,137 A    10/1999  Murata
6,862,038 B1 *  3/2005  Anderson ................ 348/207.99
(Continued)

FOREIGN PATENT DOCUMENTS

JP    2003-219346 A    7/2003
JP    2004-046591 A    2/2004
(Continued)

OTHER PUBLICATIONS

Japanese Office Action dated Feb. 24, 2009 (3 pages), and English translation thereof (6 pages), issued in counterpart Japanese Application Serial No. 2008-023980.
(Continued)

*Primary Examiner* — Chan Park
*Assistant Examiner* — Mia M Thomas
(74) *Attorney, Agent, or Firm* — Holtz, Holtz, Goodman & Chick PC

(57) ABSTRACT

An image pickup apparatus includes an image pickup unit to pick up an image of a subject which a user desires. The image pickup apparatus detects a face image area which includes a face of the subject person in the picked-up image based on the image information of the picked-up image, recognizes an expression of the face in the detected face image area, ranks the face image areas in order of good smile from among the recognized expressions, and displays the face image areas arranged in the order of ranking and the entire picked-up image on a same screen.

10 Claims, 12 Drawing Sheets

(51) Int. Cl.
*G06T 11/00* (2006.01)
*H04N 101/00* (2006.01)

(56) References Cited

U.S. PATENT DOCUMENTS

| | | | |
|---|---|---|---|
| 6,937,271 | B1 | 8/2005 | Mori et al. |
| 7,587,068 | B1 | 9/2009 | Steinberg et al. |
| 7,620,242 | B2 * | 11/2009 | Enomoto et al. ............. 382/167 |
| 7,643,742 | B2 * | 1/2010 | Watanabe et al. ............... 396/60 |
| 7,800,646 | B2 | 9/2010 | Martin |
| 7,835,550 | B2 * | 11/2010 | Tamaru ........................ 382/118 |
| 7,924,340 | B2 | 4/2011 | Kato |
| 7,978,936 | B1 * | 7/2011 | Casillas et al. ................ 382/305 |
| 8,077,216 | B2 * | 12/2011 | Ishihara ..................... 348/222.1 |
| 8,150,168 | B2 | 4/2012 | Koda |
| 8,170,292 | B2 * | 5/2012 | Ebata et al. ................... 382/115 |
| 8,285,006 | B2 * | 10/2012 | Tang ............................. 382/118 |
| 8,345,937 | B2 * | 1/2013 | Suzuki et al. ................. 382/118 |
| 8,411,908 | B2 * | 4/2013 | Ebata et al. ................... 382/115 |
| 8,599,245 | B2 * | 12/2013 | Misawa ........................... 348/47 |
| 2001/0053292 | A1 | 12/2001 | Nakamura |
| 2002/0150280 | A1 | 10/2002 | Li |
| 2002/0178189 | A1 | 11/2002 | Kurashina |
| 2002/0181784 | A1 * | 12/2002 | Shiratani ....................... 382/218 |
| 2003/0133599 | A1 | 7/2003 | Tian et al. |
| 2003/0138143 | A1 | 7/2003 | Noguchi |
| 2003/0179911 | A1 | 9/2003 | Ho et al. |
| 2003/0223622 | A1 | 12/2003 | Simon et al. |
| 2004/0120554 | A1 | 6/2004 | Lin et al. |
| 2004/0130646 | A1 | 7/2004 | Terada |
| 2004/0183951 | A1 | 9/2004 | Lee |
| 2004/0240708 | A1 | 12/2004 | Hu et al. |
| 2005/0041840 | A1 * | 2/2005 | Lo ................................. 382/118 |
| 2005/0046730 | A1 | 3/2005 | Li |
| 2005/0102246 | A1 | 5/2005 | Movellan et al. |
| 2005/0105770 | A1 | 5/2005 | Sumitomo et al. |
| 2005/0149364 | A1 * | 7/2005 | Ombrellaro ....................... 705/3 |
| 2005/0219393 | A1 | 10/2005 | Sugimoto |
| 2005/0234324 | A1 | 10/2005 | Sugimoto |
| 2005/0238217 | A1 * | 10/2005 | Enomoto et al. ............. 382/128 |
| 2005/0276443 | A1 | 12/2005 | Slamani et al. |
| 2006/0115185 | A1 | 6/2006 | Iida et al. |
| 2006/0120572 | A1 | 6/2006 | Li et al. |
| 2006/0153470 | A1 | 7/2006 | Simon et al. |
| 2006/0198554 | A1 * | 9/2006 | Porter et al. ................... 382/159 |
| 2006/0204050 | A1 | 9/2006 | Takizawa |
| 2006/0228037 | A1 | 10/2006 | Simon et al. |
| 2006/0233426 | A1 | 10/2006 | Mariani |
| 2006/0274960 | A1 * | 12/2006 | Tamaru ........................ 382/274 |
| 2007/0098396 | A1 | 5/2007 | Watanabe et al. |
| 2007/0139512 | A1 * | 6/2007 | Hada et al. ................. 348/14.01 |
| 2007/0242149 | A1 * | 10/2007 | Zhang ...................... 348/333.01 |
| 2007/0242861 | A1 * | 10/2007 | Misawa et al. ................ 382/118 |
| 2008/0002865 | A1 * | 1/2008 | Toyoda .......................... 382/118 |
| 2008/0025578 | A1 | 1/2008 | Nozawa |
| 2008/0112648 | A1 | 5/2008 | Hatano |
| 2008/0186387 | A1 | 8/2008 | Iwamoto et al. |
| 2008/0231715 | A1 | 9/2008 | Endo |
| 2008/0285800 | A1 | 11/2008 | Miyake et al. |
| 2008/0297586 | A1 * | 12/2008 | Kurtz et al. ................. 348/14.08 |
| 2008/0317297 | A1 | 12/2008 | Willmann et al. |
| 2009/0059058 | A1 * | 3/2009 | Okabe et al. ................... 348/345 |
| 2009/0080714 | A1 | 3/2009 | Koda |
| 2009/0089712 | A1 * | 4/2009 | Sato .............................. 715/838 |
| 2009/0153678 | A1 | 6/2009 | Nonaka et al. |
| 2009/0158954 | A1 | 6/2009 | Wardecki et al. |
| 2009/0268080 | A1 * | 10/2009 | Song et al. ..................... 348/349 |
| 2009/0316016 | A1 * | 12/2009 | Iwamoto .................... 348/222.1 |
| 2010/0066822 | A1 | 3/2010 | Steinberg et al. |
| 2010/0141786 | A1 | 6/2010 | Bigioi et al. |
| 2010/0157084 | A1 * | 6/2010 | Shimamura et al. ....... 348/222.1 |
| 2010/0165091 | A1 * | 7/2010 | Teranishi et al. ................ 348/77 |
| 2011/0058713 | A1 * | 3/2011 | Kogane et al. ................ 382/118 |
| 2011/0181774 | A1 * | 7/2011 | Masuda ........................ 348/473 |
| 2011/0263946 | A1 * | 10/2011 | el Kaliouby et al. ......... 600/300 |
| 2011/0274316 | A1 | 11/2011 | Jeong et al. |
| 2012/0274562 | A1 | 11/2012 | Ps et al. |
| 2013/0156277 | A1 * | 6/2013 | Sasaki ........................... 382/118 |
| 2013/0201104 | A1 * | 8/2013 | Ptucha et al. .................. 345/158 |
| 2013/0242140 | A1 * | 9/2013 | Uemura et al. ................ 348/239 |
| 2014/0125856 | A1 * | 5/2014 | Kim et al. ................. 348/333.02 |
| 2015/0015690 | A1 * | 1/2015 | Roh et al. ......................... 348/77 |

FOREIGN PATENT DOCUMENTS

| | | |
|---|---|---|
| JP | 2005-102175 A | 4/2005 |
| JP | 2005-522790 A | 7/2005 |
| JP | 2005-277726 A | 10/2005 |
| JP | 2005-323015 A | 11/2005 |
| JP | 2007-019678 A | 1/2007 |

OTHER PUBLICATIONS

Japanese Office Action dated May 26, 2009 and English translation thereof issued in a counterpart Japanese Application No. 2008-023980.

* cited by examiner

| Registration number | Registration name | Priority level | Face image data |
|---|---|---|---|
| 1 | Father | 1 | N0001.jpg |
| 2 | Mother | 1 | N0002.jpg |
| 3 | Brother | 2 | N0003.jpg |
| 4 | Sister | - | N0004.jpg |
| 5 | Grandfather | 3 | N0005.jpg |
| ⋮ | ⋮ | ⋮ | ⋮ |

IMAGE PICKUP APPARATUS EQUIPPED WITH FACE-RECOGNITION FUNCTION

CROSS-REFERENCE TO RELATED APPLICATIONS

This is a Divisional of U.S. application Ser. No. 12/057,753, filed Mar. 28, 2008, which is based upon and claims the benefit of priority from Japanese Patent Application No. 2007-092815, filed Mar. 30, 2007, and Japanese Patent Application No. 2008-023980, filed Feb. 4, 2008, the entire contents of all of which are incorporated herein by reference.

BACKGROUND OF THE INVENTION

1. Field of the Invention

The present invention relates to an image pickup apparatus, an image display apparatus, a method thereof and a storage medium which stores a program thereof.

2. Description of Related Art

Conventionally, there is known a technique in which the face-recognition is carried out by obtaining an image of a face and generating a face prototype (for example, JP2005-522790A).

Moreover, in recent years, there is known an image pickup apparatus which enables the preferable image pickup of a person by recognizing the face of the subject person.

When the above image pickup apparatus of conventional technique is used for picking up an image of a person and when the image pickup apparatus carries out the face recognition of the subject person, the picking up of an image according to the image pickup condition which is set in advance in the image pickup apparatus and which is optimized for photographing a person can be carried out. However, there are cases where it is difficult for the photographer to carry out the picking up of an image by confirming the aspect of the face of the subject person when the subject person appears in small size, and for example, there is a problem that the shutter chance in which the line of sight, the expression and the like of the person are at the perfect timing is missed.

Moreover, it has been difficult to promptly confirm the aspect of the face of the subject person when the photographed image is being confirmed.

SUMMARY OF THE INVENTION

An object of the present invention is to provide an image pickup apparatus, an image display apparatus, a method thereof and a storage medium which stores a program thereof in which an aspect of a face of a subject person can be confirmed more promptly.

According to one aspect of the present invention, an image pickup apparatus comprises an image pickup unit to pick up an image of a subject, a display unit to display a picked-up image which is picked up by the image pickup unit, a face detection device to detect a face area which includes a face of the subject within the picked-up image based on image information of the picked-up image and an image display control device to make the display unit display a face image of the face area detected by the face detection device along with the picked-up image, the face image being enlarged so as to be larger than the face of the subject in the picked-up image which is displayed in the display unit.

According to a further aspect of the present invention, an image display apparatus comprises a display unit to display an entire image, a face detection device to detect a face area which includes a face in the entire image based on image information of the entire image and an image display control device to make the display unit display the face area which is detected by the face detection device along with the entire image, a face image being enlarged so as to be larger than the face in the entire image which is displayed in the display unit.

According to a further aspect of the present invention, an image display method comprise detecting a face area which includes a face in the entire image based on image information of the entire image and displaying the entire image and the detected face area by enlarging a face image larger than the face in the entire image which is displayed.

According to a further aspect of the present invention, a storage medium for storing a program realizes function of detecting a face area which includes a face in the entire image based on image information of the entire image and displaying the entire image and the detected face area by enlarging a face image larger than the face in the entire image which is displayed.

BRIEF DESCRIPTION OF THE DRAWINGS

FIG. 13 is a diagram showing an example of a face image registration table which is recorded in the image pickup apparatus of FIG. 12.

DESCRIPTION OF THE PREFERRED EMBODIMENT

Hereinafter, a specific embodiment regarding the present invention will be described with reference to the drawings. However, the scope of the invention is not limited to the illustrated examples.

Figure 1:
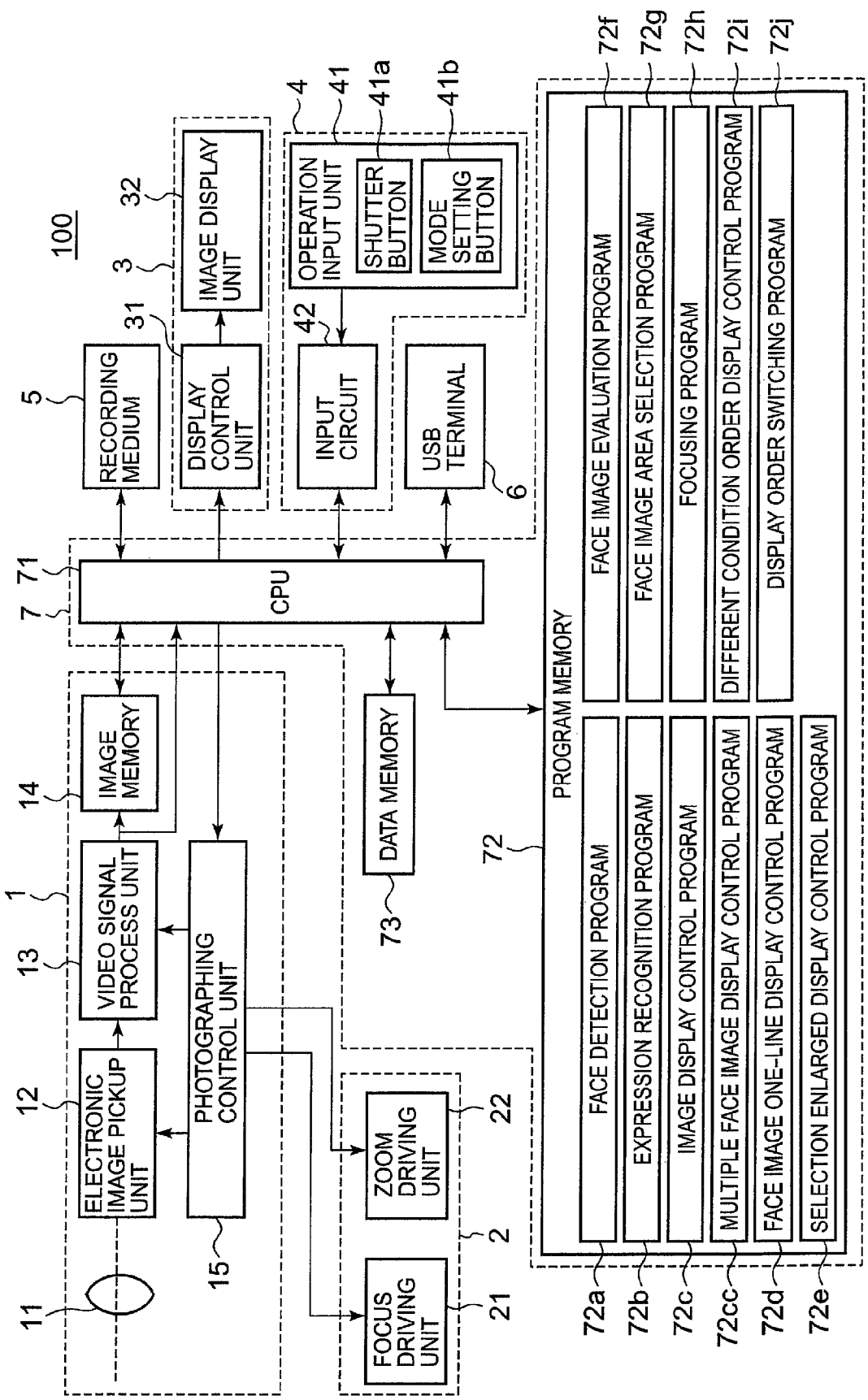
FIG. 1 is a block diagram showing an outline structure of an image pickup apparatus which applies the present invention.

FIG. 1 is a block diagram showing an outline structure of an image pickup apparatus 100 of an embodiment which applies the present invention.

When the image pickup apparatus 100 of the embodiment displays a picked-up image in which an image of a desired subject is picked up in the display unit, the image pickup apparatus 100 detects a face of a person in the picked-up image, enlarges the face image area (face area) which includes the face of the person, and carries out the image display process of displaying the face image in the face image area along with the picked-up image on the same screen in the display unit.

Particularly, the image pickup apparatus 100 comprises an image pickup unit 1, an image pickup support unit 2, a display unit 3, an operation unit 4, a recording medium 5, a USB terminal 6, a control unit 7 and the like as shown in FIG. 1.

The image pickup unit 1 picks up an image of the subject in the direction in which the image pickup apparatus 100 is faced by the photographer. Particularly, the image pickup unit 1 comprises a group of image pickup lenses 11, an electronic image pickup unit 12, a video signal process unit 13, an image memory 14, a photographing control unit 15 and the like.

The group of image pickup lenses 11 has a focus function and a zoom function, and is constituted of a plurality of image pickup lenses.

The electronic image pickup unit 12 is constituted of the CCD (Charge Coupled Device), the CMOS (Complementary Metal-Oxide Semiconductor) or the like which is an image pickup sensor which converts the subject image which passed through the group of image pickup lenses 11 into a two dimensional image signal.

The image signal process unit 13 carries out a predetermined image process to the image signal which is output from the electronic image pickup unit 12.

The image memory 14 temporarily stores the image signal in which the image process is carried out.

The photographing control unit 15 controls the electronic image pickup unit 12 and the image signal process unit 13 under the control of the CPU 71.

The image pickup support unit 2 is driven when the image pickup unit 1 picks up an image of the subject, and the image pickup support unit 2 comprises a focus driving unit 21, a zoom driving unit 22 and the like.

The focus driving unit 21 drives the focus mechanism unit (omitted from the drawing) which is connected to the group of image pickup lenses 11.

The zoom driving unit 22 drives the zoom mechanism unit (omitted from the drawing) which is connected to the group of image pickup lenses 11.

Here, the focus driving unit 21 and the zoom driving unit 22 are connected to the photographing control unit 15, and are driven under the control of the photographing control unit 15.

The display unit 3 displays the image which is picked up by the image pickup unit 1, and comprises a display control unit 31, an image display unit 32 and the like.

The display control unit 31 comprises a video memory (omitted from the drawing) to temporarily store the display data which is arbitrarily output from the CPU 71.

The image display unit 32 comprises a liquid crystal monitor or the like to display a predetermined image based on the output signal from the display control unit 31. Here, the image display unit 32 displays the through image which is an image read by being formed in the electronic image pickup unit 12 of the image pickup unit 1 and the REC image which is an image corresponding to the image data which is recorded in the recording medium 5 and the like.

The operation unit 4 is for carrying out a predetermined operation of the image pickup apparatus 100, and the operation unit 4 comprises an operation input unit 41, an input circuit 42 and the like.

The operation input unit 41 comprises various types of operation switches and the like such as a shutter button 41a, a mode setting button 41b and the like.

The shutter button 41a instructs the photographing of the subject by the image pickup unit 1. Further, the shutter button 41a is constituted so that the two-step pressing operation which includes the half-press operation and the all-press operation can be carried out.

The mode setting button 41b is for switching the image pickup mode to the normal image pickup mode, the people image pickup mode and the like and setting.

The input circuit 42 is for inputting the operation signal which is input from the operation input unit 41 to the CPU 71.

For example, the recording medium 5 is constituted of a card type non-volatile memory (flash memory), a hard disk and the like, and stores the image information (image data) of the picked-up image which is picked up by the image pickup unit 1 as the image recording unit.

The USB terminal 6 is a terminal for connecting the image pickup apparatus with the external device, and carries out the sending and receiving of the data via the USB cable (omitted from the drawing) or the like.

The control unit 7 is for controlling each unit of the image pickup apparatus 100, and comprises the CPU 71, a program memory 72, a data memory 73 and the like.

The CPU 71 carries out various types of control operations in compliance with various types of programs for the image pickup apparatus 100 which are stored in the program memory 72.

For example, the data memory 73 is constituted of a flash memory and the like, and temporarily stores the data and the like which are to be processed by the CPU 71.

The program memory 72 is for storing various types of programs and data which are needed for the operation of the CPU 71. Particularly, the program memory 72 stores a face detection program 72a, an expression recognition program 72b, an image display control program 72c, a multiple face image display control program 72cc, a face image one-line display control program 72d, a selection enlarged display control program 72e, a face image evaluation program 72f, a face image area selection program 72g, a focusing program 72h, a different condition order display control program 72i, a display order switching program 72j and the like.

The face detection program 72a makes the CPU 71 function as the face detection device. That is, the face detection program 72a is a program which makes the CPU 71 realize the function according to the face detection process which detects the face image area including the face of the subject person in the picked-up image based on the image information of the picked-up image (entire image) which is picked up by the image pickup unit 1.

The expression recognition program 72b makes the CPU 71 function as the expression recognition device. That is, the expression recognition program 72b is a program to make the CPU 71 realize the function according to the expression recognition process which recognizes the expression of the face in the face image area which is detected by the CPU 71.

Here, as for the technique of recognizing the expression of a face of a person in the image, a method of JP3-252775A, a method of JP8-249447A, a method of JP8-249453A, a method of JP10-255043A and the like are known, for example. By using such known techniques, the function according to the expression recognition process can be realized by the CPU 71.

The image display control program 72c makes the CPU 71 function as the image display control device. That is, the image display control program 72c is a program to make the CPU 71 realize the function according to the image display process which enlarges the face image area which is detected in the face detection process carried out by the CPU 71 and which displays the enlarged face image area in the image display unit 32 of the display unit 3 along with the picked-up image (entire image).

By the CPU 71 executing the image display control program 72c, the CPU 71 enlarges a single face image area or respectively enlarges a plurality of face image areas which is detected in the face detection process and displays the face image of the face image area in the image display unit 32 of the display unit 3 along with the picked-up image. Alternatively, the CPU 71 respectively enlarges the predetermined number of face image areas which are selected among a plurality of face image areas detected in the face detected process and displays the face images of the enlarged face image area in the image display unit 32 of the display unit 3 along with the picked-up image. In such way, the predetermined face image which is enlarged so as to be larger than the face of the person in the displayed image is displayed in the image display unit 32 along with the picked-up image.

The multiple face image display control program 72cc is a part of the image display control program 72c, and makes the CPU 71 function as the multiple face image display control device. That is, the multiple face image display control program 72cc is a program to make the CPU 71 realize the function according to the multiple face image display control process which respectively enlarges a plurality of face image areas detected in the face detection process carried out by the CPU 71 and displays the face images of the plurality of face image areas in the image display unit 32 of the display unit 3 along with the picked-up image.

The face image one-line display control program 72d is a part of the image display control program 72c, and makes the CPU 71 function as the face image one-line display control device. That is, the face image one-line display control program 72d is a program to make the CPU 71 realize the function according to the face image one-line display control process which respectively enlarges the plurality of face image areas detected in the face detection process carried out by the CPU 71 and displays the face images of all the face image areas in approximately one line in the image display unit 32 of the display unit 3 along with the picked-up image.

The selection enlarged display control program 72e is a part of the image display control program 72c, and makes the CPU 71 function as the selection enlarged display control device. That is, the selection enlarged display control program 72e is a program to make the CPU 71 realize the function according to the selection enlarged display control process which respectively enlarges the predetermined number of face image areas which are selected in the face image area selection process (mentioned bellow) carried out by the CPU 17 and displays the face images of the face image areas in the image display unit 32 of the display unit 3 along with the picked-up image.

The face image evaluation program 72f makes the CPU 71 function as the face image evaluation device. That is, the face image evaluation program 72f is a program to make the CPU 71 realize the function according to the face image evaluation process which carries out the evaluation regarding the specific condition to the face images of the face image areas based on the image information of each of the plurality of face image areas detected in the face detection process carried out by the CPU 71.

Here, as for the specific condition considered in the evaluation, expression of the face in each face image area, contrast, brightness, size and the like are suggested, for example. Further, the face images are evaluated in the order of good expression (smile) in the expression recognition, in the order of good contrast or good brightness in the face image area, in descending order of size of the face image areas and the like, for example.

Here, as for the evaluation, ranking and scoring are suggested, for example, and the ranking is adopted in the face image evaluation process of the embodiment.

The face image area selection program 72g makes the CPU 71 function as the face image area selection device. That is, the face image area selection program 72g is a program to make the CPU 71 realize the function according to the face image area selection process which selects the predetermined number of face image areas among the plurality of face image areas detected in the face detection process carried out by the CPU 71.

Here, for example, the predetermined number of face image areas to be selected in the face image area selection process is maximum of five which is the number of the face image areas displayable in the display unit 3 when the number of the detected face image areas is more than the number of the face image areas displayable in the image display unit 32 of the display unit 3. Further, the predetermined number is the number which is set in advance and which may be the top five in the ranking carried out in the face image evaluation process.

The focusing program 72h is a program to make the CPU 71 realize the function according to the focusing process which focuses on the subject person who corresponds to the best face image area based on the result of the ranking carried out in the face image evaluation process which is carried out by the CPU 71. Particularly, the CPU 71 carries out the focusing process to a predetermined subject by controlling the focus driving unit 21 via the photographing control unit 15 by executing the focusing program 72h.

The different condition order display control program 72i makes the CPU 71 function as the different condition order display control device. That is, the different condition order display control program 72i is a program to make the CPU 71 realize the function according to the different condition order display control process which displays the face images of the plurality of face image areas detected in the face detection process carried out by the CPU 71 in the order of the evaluation carried out by the face image evaluation process by the CPU 71 by specific conditions which are different from one another between a case the through image which is picked up by the image pickup unit 1 is displayed in the image display unit 32 of the display unit 3 and a case that the recorded image based on the image information recorded in the recording medium 5 is displayed in the image display unit 32 of the display unit 3.

The display order switching program 72*j* is a part of the image display control program 72*c*, and makes the CPU 71 function as the display order switching device. That is, the display order switching program 72*j* is a program to make the CPU 71 realize the function according to the display order switching process which orderly switches the display order of the face image areas according to the result of the ranking which is orderly carried out in the face image evaluation process by the CPU 71 by the specific condition.

Figure 2:
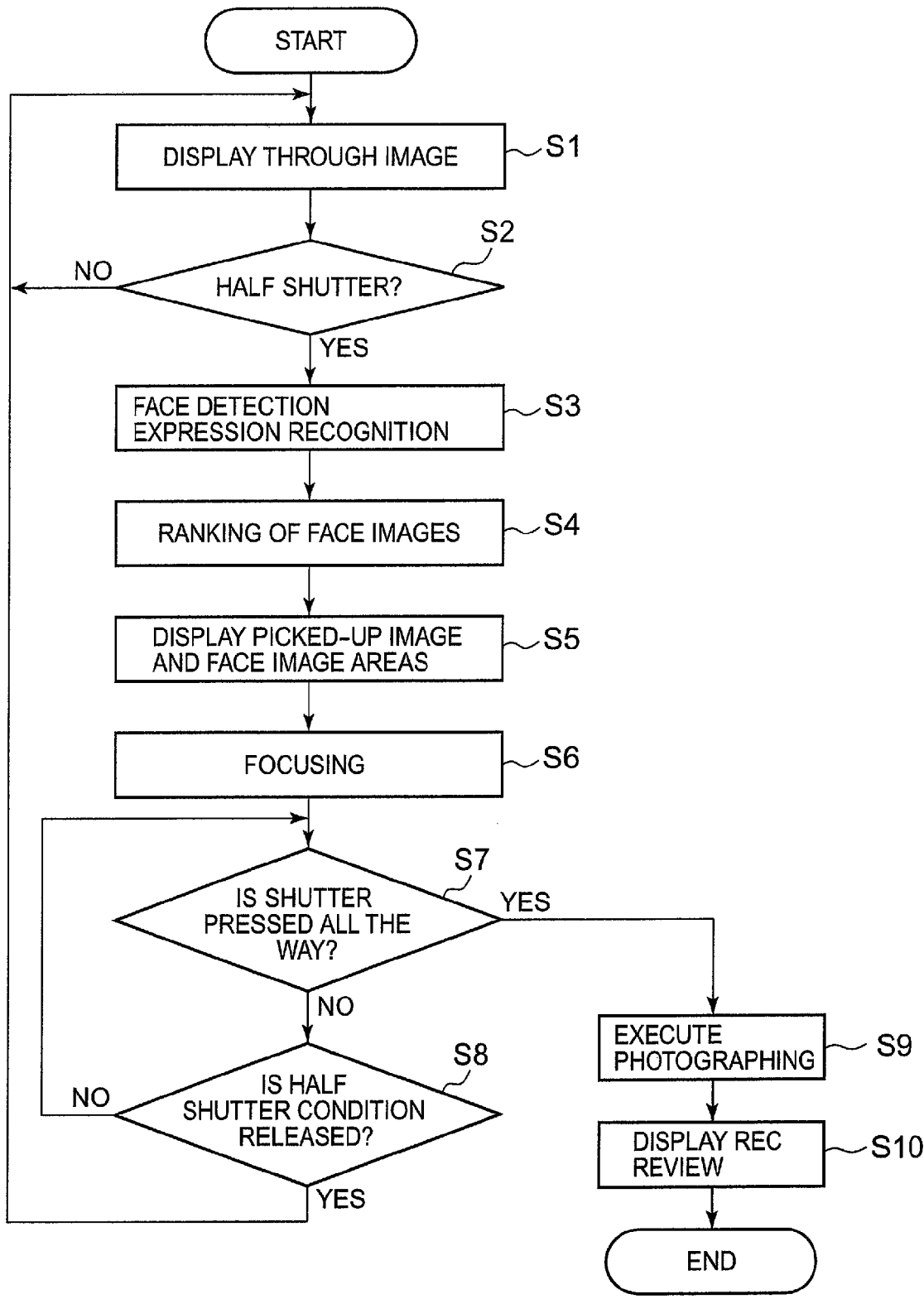
FIG. 2 is a flowchart showing a process which is carried out when an image of a subject person is picked up by the image pickup apparatus according to the present invention.

Next, the process which is carried out when the image of the subject person is picked up in the image pickup apparatus 100 of the embodiment will be described based on the flowchart shown in FIG. 2.

Figure 3:
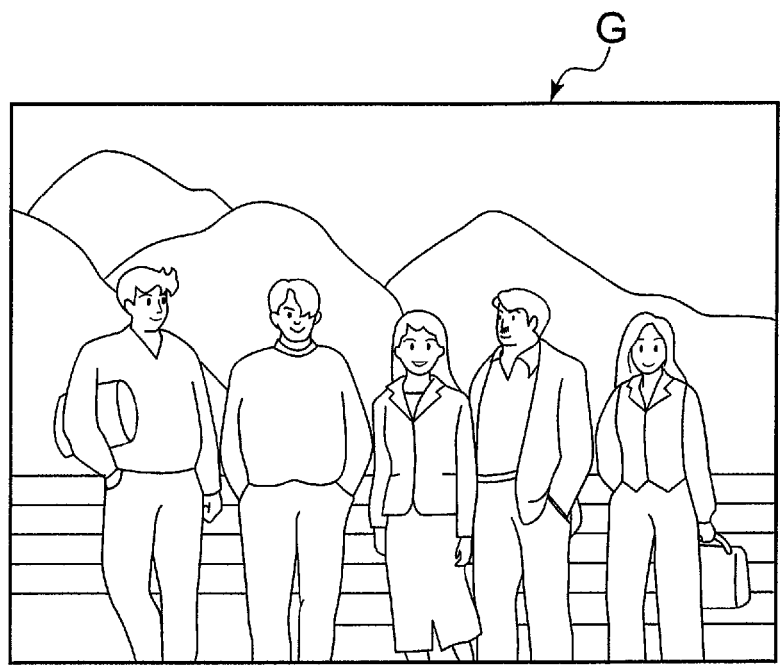
FIG. 3 is an explanatory diagram showing a picked-up image which is a through image of the subjects captured by the image pickup apparatus.

First, when the image pickup apparatus 100 which is set in the people photographing mode based on the predetermined operation of the operation unit 4 (for example, the mode setting button 41*b*) by a user (photographer) is faced toward the desired subject person, the image which is formed in the electronic image pickup unit 12 through the group of image pickup lenses 11 becomes a through image and the through image is displayed on the display screen of the image display unit 32 of the display unit 3 (step S1) as shown in FIG. 3.

Subsequently, the CPU 71 determines whether the shutter button 41*a* is in the half shutter condition by being half-pressed by an operation of a user or not (step S2).

When the CPU 71 determines that the shutter button is in the half shutter condition (step S2; YES), the CPU 71 detects the face of the subject person within the picked-up image based on the image information of the picked-up image G which is picked up by the image pickup unit 1 by executing the face detection program 72*a* in the program memory 72, obtains the data relating to the expression of the face of the person in each face image area by executing the expression recognition program 72*b* in the program memory 72 after obtaining the face image area which includes the face of the person, and carries out the expression recognition (step S3).

Next, the CPU 71 executes the face image evaluation program 72*f* within the program memory 72 and carries out the ranking regarding the expression of the face of the person in each face image area (step S4). Particularly, when there are face image areas which are in the same rank in the ranking, the face image area which is positioned more in the center of the screen in the picked-up image is made to be higher in the priority rank.

Then, the CPU 71 executes the image display control program 72*c* and the different condition order display control program 72*i* in the program memory 72 and the face image one-line display control program 72*d* which is a part of the image display control program 72*c*, and enlarges the face image areas. Further, the CPU 71 arranges each face image area F, . . . in one vertical line in the left side of the display screen from top down in the order (ascending order) of ranking by good expression (smile) and superimposedly displays each face image area so as to partially overlap the picked-up image G, and displays the enlarged face image area F on the same screen in the image display unit 32 of the display unit 3 along with the picked-up image G which is the through image (step S5).

Here, faces of five subject persons are detected and recognized in the picked-up image G and the face image areas F for the five people are displayed. Further, a face recognition frame W is displayed for the portions corresponding to the face image areas F in the picked-up image G.

Figure 4:
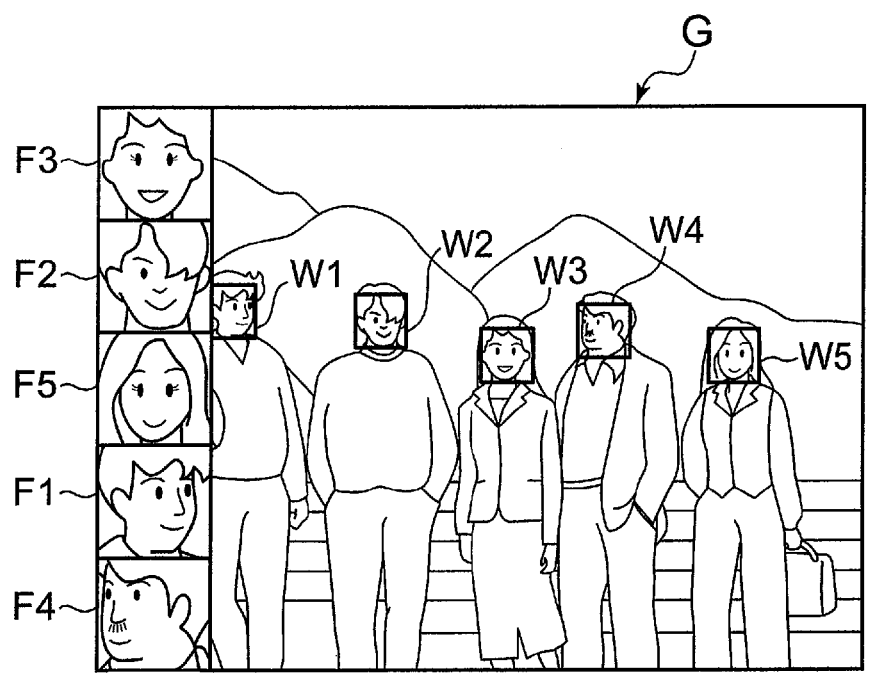
FIG. 4 is an explanatory diagram showing a display screen which displays enlarged face image areas so as to overlap the picked-up image.

In the picked-up image G in FIG. 4, the face recognition frame W of W1, W2, W3, W4 and W5 are allotted to the five subject persons in the picked-up image G from the left, and the face image areas F for five people in which the W3, W2, W5, W1 and W4 are respectively corresponded are simultaneously displayed in the left side of the screen by being arranged in the order of F3, F2, F5, F1 and F4 from the top.

Here, the CPU 71 may switch the display so as to switch the arrangement order of the face image areas F by executing the display order switching program 72*j* which is a part of the image display control program 72*c* according to the varying of the ranking of each face image area which occurs due to the occurrence of the change in the picked-up image G by the angle and the direction in which a user faces the image pickup apparatus 100 to the subject changing or by the subject person not moving. In such case, for example, when the half shutter condition is not released in step S8 of the flowchart of FIG. 2, step S7 is not executed and step S3 is executed. Thereby, the face detection and the ranking are always carried out while the shutter is being pressed in the half shutter condition, and the change in the ranking can be detected. In such way, the image pickup apparatus 100 can carryout the display relating to the updated ranking data according to the varying of the rank of each face image area F.

Then, the CPU 71 controls the focus driving unit 21 by executing the focusing program 72*h* within the program memory 72 and focuses on the subject person who corresponds to the face image area which is ranked and set as the best expression (smile) (step S6).

Next, the CPU 71 determines whether the photographing operation is carried out by the shutter button 41*a* being pressed all the way by the operation of a user or not (step S7).

When the CPU 71 determines that the shutter button 41*a* is pressed all the way (step S7; YES), the process proceeds to step S9.

On the other hand, when the CPU 71 determines that the shutter button 41*a* is not pressed all the way (step S7; NO), the CPU 71 determines whether the half shutter condition in which the shutter button 41*a* is pressed half way is released or not (step S8).

When the CPU 71 determines that the half shutter condition is not released (step S8; NO), the process returns to step S7. On the other hand, when the CPU 71 determines that the half shutter condition is released (step S8; YES), the process returns to step S1.

In step S9, the CPU 71 records the image information of the image which is formed in the electronic image pickup unit 12 through the group of image pickup lenses 11 in the recording medium 5 at the timing when the shutter button 41*a* is pressed all the way (step S9), and executes the picking up of the image of the subject.

When the picked-up image which is recorded in the recording medium 5 is displayed in the image display unit 32 of the display 3 as the REC view based on the predetermined operation of the operation unit 4 by a user so as to confirm the picked-up image, the CPU 71 executes the image display control program 72*c* and the different condition order display control program 72*i* in the program memory 72, displays a plurality of face image areas detected in the picked-up image which are recorded in the recording medium 5 in the ascending order by the good contrast as the specific condition from top down, and displays the face image areas on the same screen in the image display unit 32 of the display unit 3 along with the picked-up image (step S10).

Figure 5:
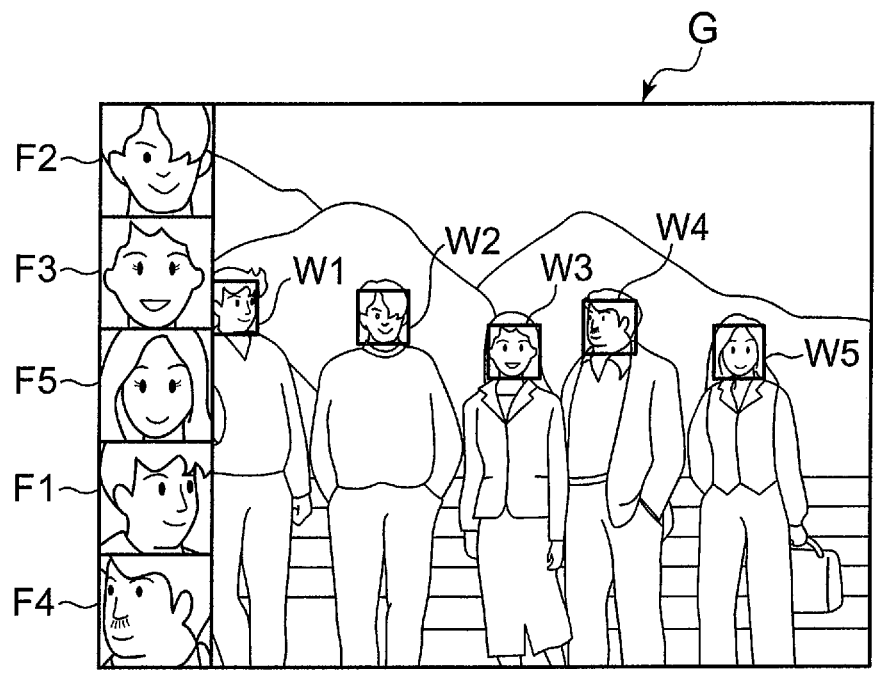
FIG. 5 is an explanatory diagram showing a display screen when the picked-up image is displayed as a REC image.

Particularly, for example, when the picked-up image G which is recorded in the recording medium 5 is to be displayed in the image display unit 32, the order of the face image areas F3 and F2 which were the first ranking and the second ranking in the ranking by the good expression (smile) (see FIG. 4) switches, and the display of the face image area portions are to be switched as shown in FIG. 5 when a plurality of face image areas F in the picked-up image G are simultaneously displayed in the ascending order of the good contrast from top down.

In such way, by simultaneously displaying a plurality of face image areas in the order of ranking by different specific conditions between a case that the through image which is picked up by the image pickup unit 1 is to be displayed (see FIG. 4) and a case that the recording image based on the image information recorded in the recording medium 5 is to be displayed (see FIG. 5), the ranking which is preferable for photographing and the ranking preferable for confirming the recorded image can be used according to the situation.

When the face image areas are to be displayed in the order by the good contrast, it is preferable to display the face image area which has a good smile so as to be recognizable by displaying a frame (face recognition frame W) in a different display mode for the face image area or by attaching a predetermined smile mark to the face image area so that the face image area which is determined as having a good expression (smile) in the expression recognition can be discriminated.

Then, the image pickup process is finished based on a predetermined operation of the operation unit 4 by a user.

As described above, according to the image pickup apparatus 100 of the present invention, a plurality of faces of persons which were captured as subjects for photographing are detected within the picked-up image and a plurality of face image areas in which the area including the detected faces of the persons are enlarged and the entire picked-up image can be displayed on the same screen. Therefore, the photographing of the desired person can be carried out by pressing the shutter button by confirming the timing in which the line of sight, the expression and the like of the person are good while looking at the face of the subject person. That is, the aspect of the face of the subject person can be confirmed promptly, and an appropriate photographing can be carried out.

Particularly, because the face image areas which are enlarged and displayed are ranked by the specific condition such as the expression (smile) of the faces, the better subject person can be recognized according to the ranking. Further, the photographing can be preferably carried out by focusing on the subject person according to the result of the ranking.

Therefore, the subject person can be photographed more appropriately by using the image pickup apparatus 100 by carrying out the photographing while confirming the line of sight, the expression and the like of the subject person.

Here, the present invention is not limited to the above embodiment.

Figure 6:
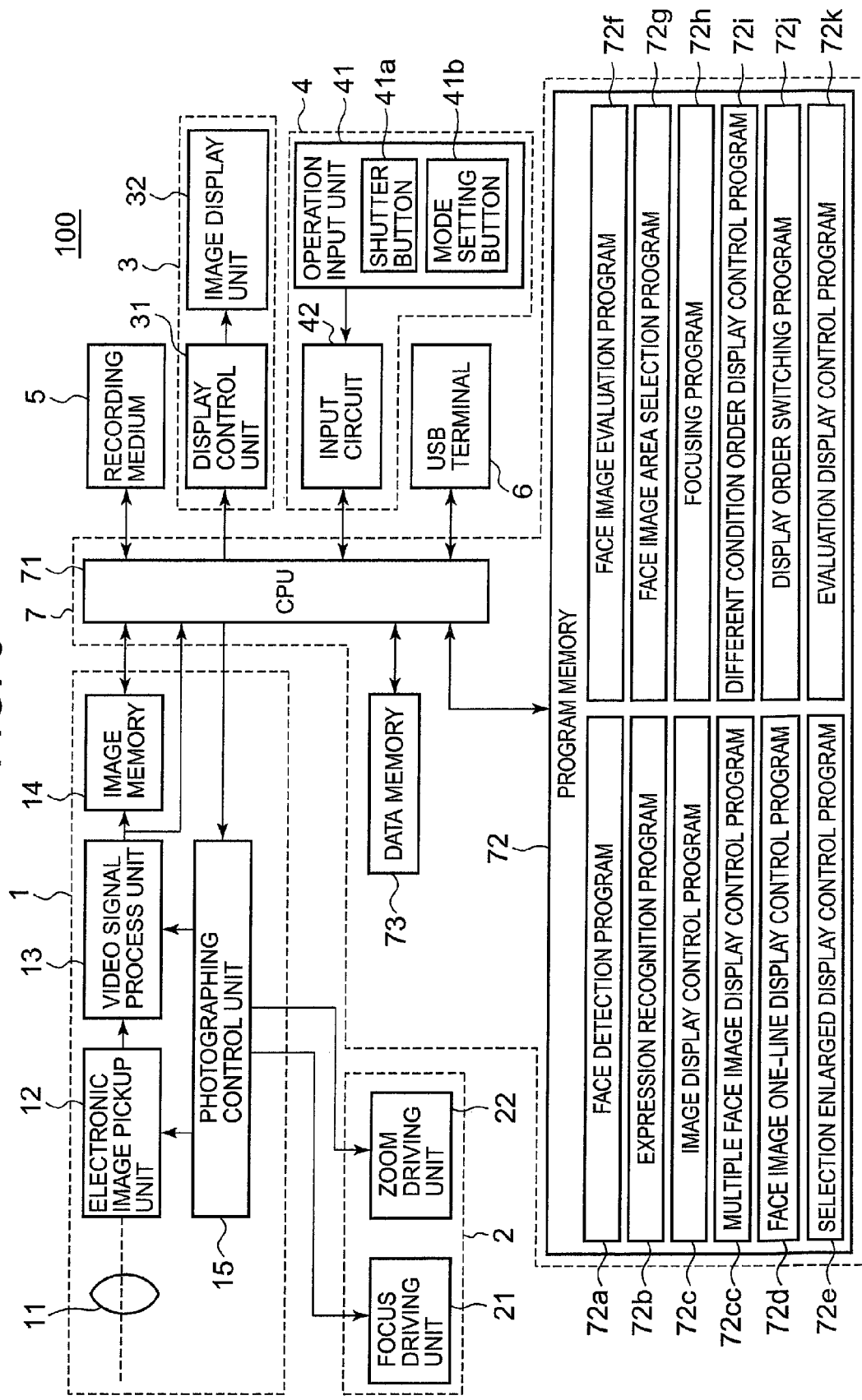
FIG. 6 is a block diagram showing a modification example of the image pickup apparatus.

For example, the image pickup apparatus 100 may store the evaluation display control program 72k in the program memory 72 as shown in FIG. 6.

The evaluation display control program 72k makes the CPU 71 function as the evaluation display control device. That is, the evaluation display control program 72k is a program to make the CPU 71 realize the function according to the evaluation display control process which displays the face image areas by having numerical values (for example, ranking and score) according to the evaluation of each face image area F associated so as to correspond with the evaluation result of the face image evaluation process carried out by the CPU 71.

Figure 7:
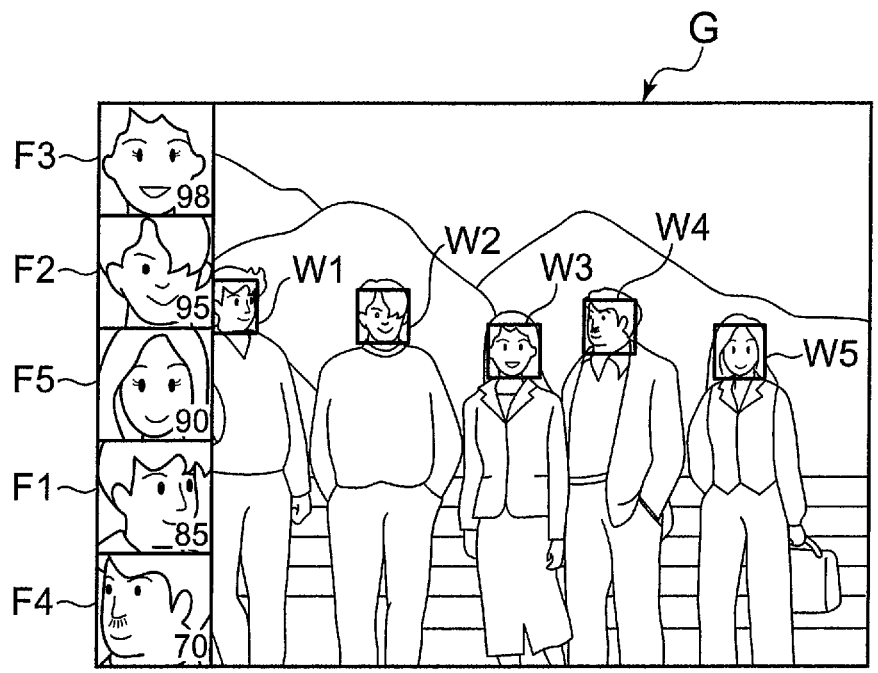
FIG. 7 is an explanatory diagram showing a display screen in which the enlarged face image areas are respectively corresponded with a score according to ranking.

When the CPU 71 executes the evaluation display control program 72k when each face image area F, . . . are arranged and displayed in the left side of the display screen in step S5, for example, the face image areas are to be displayed by having a score regarding the smile associated to each face image area F (for example, F3; 98 points, F2; 95 points, F5; 90 points, F1; 85 points and F4; 70 points) as shown in FIG. 7. Here, the numerical value according to the ranking which is associated with the face image areas F is not limited to the score, and the numerical value may be the number of ranking regarding the smile (for example, F3; first ranking, F2; second ranking, F5; third ranking, F1; forth ranking and F4; fifth ranking).

Moreover, when the face image areas F are displayed by having the numerical value according to the ranking is associated as described above, only the numerical value of the score or the like may be changed without changing the arrangement order of each face image area F, . . . .

Figure 8:
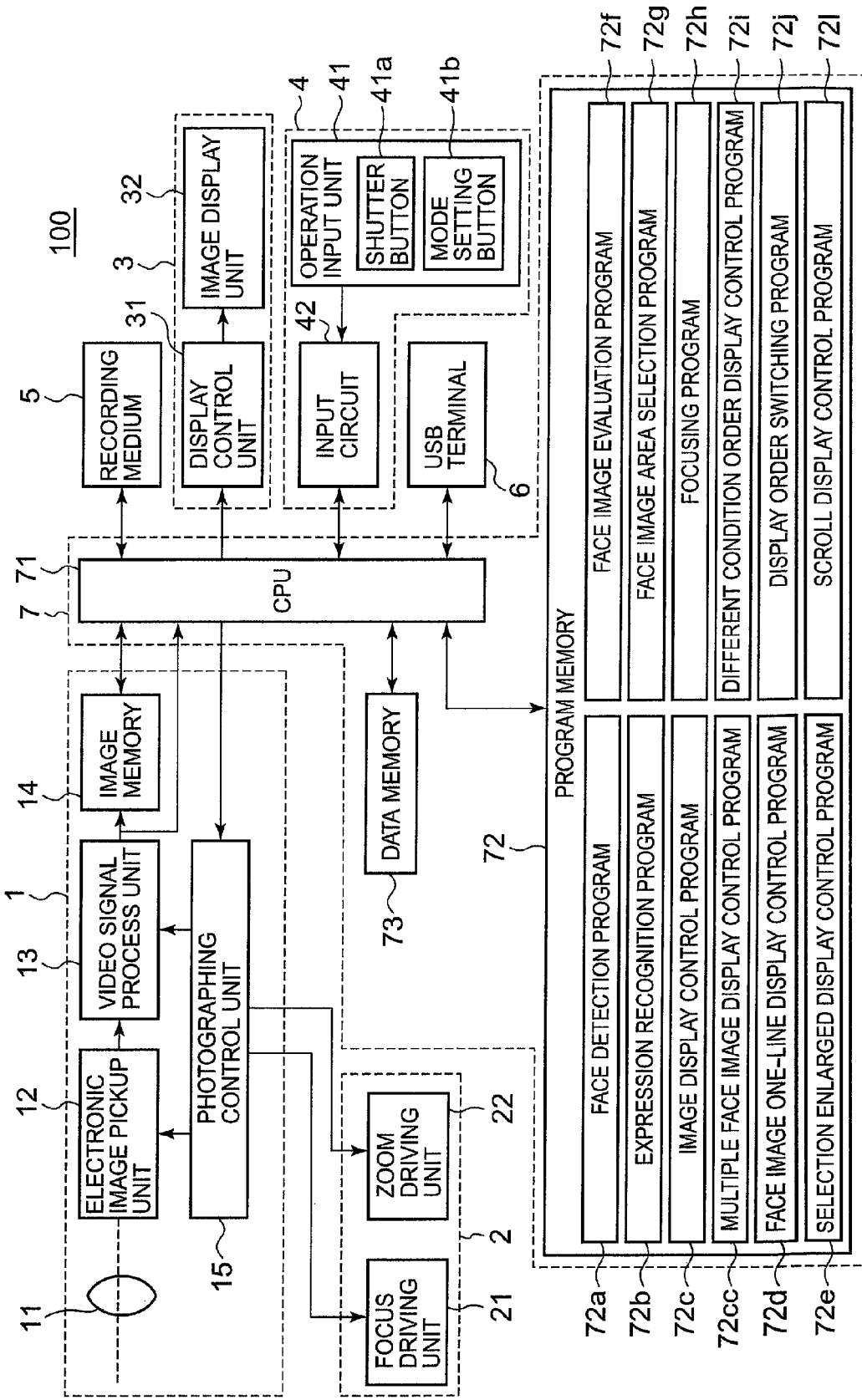
FIG. 8 is a block diagram showing a modification example of the image pickup apparatus.

Moreover, for example, the image pickup apparatus 100 may store the scroll display control program 72l in the program memory 72 as shown in FIG. 8.

The scroll display control program 72l makes the CPU 71 function as the scroll display control device. That is, the scroll display control program 72l is a program to make the CPU 71 realize the function according to the scroll display control process which performs the scroll display of the plurality of face image areas F which are detected in the face detection process carried out by the CPU 71 in the display unit 3.

Figure 9A:
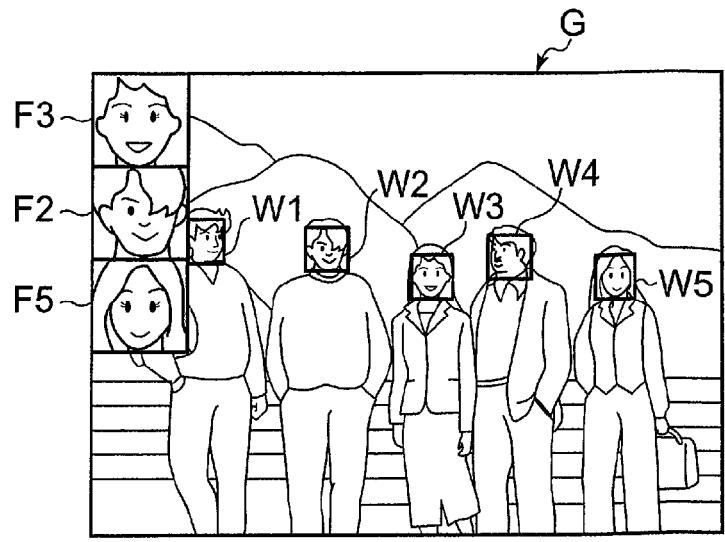
FIG. 9A is an explanatory diagram showing a display screen which performs a scroll display of three enlarged face image areas so as to overlap the picked-up image.
Figure 9B:
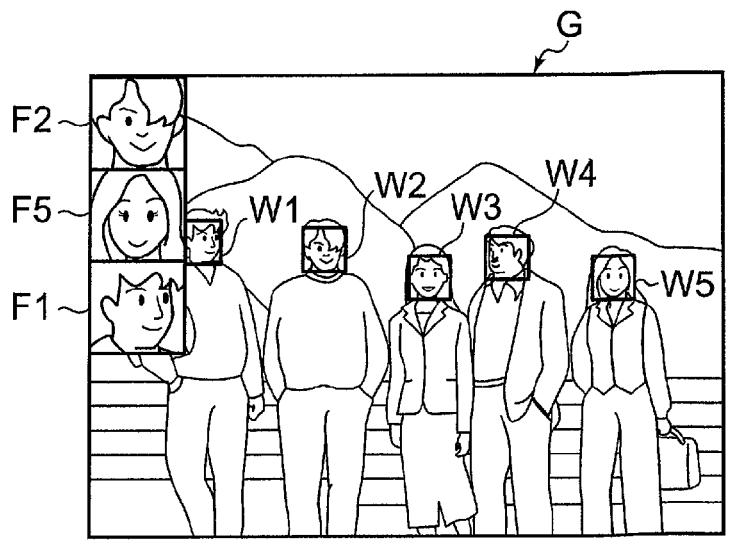
FIG. 9B is an explanatory diagram showing a display screen which performs the scroll display of three enlarged face image areas so as to overlap the picked-up image.
Figure 9C:
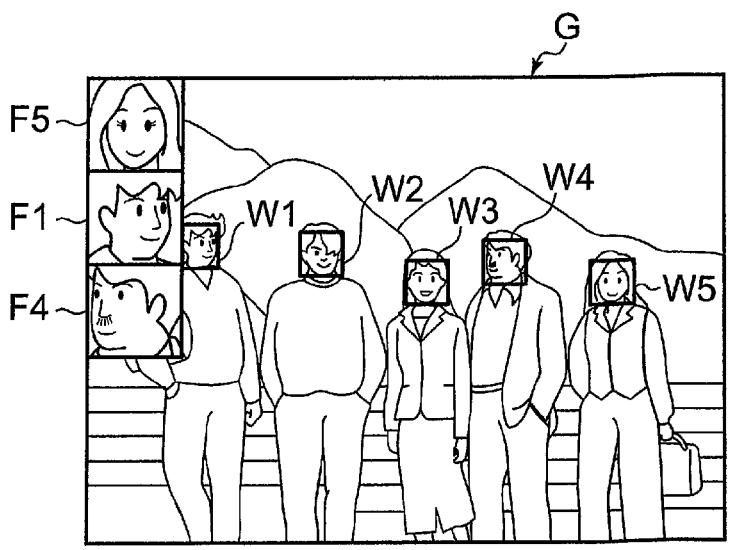
FIG. 9C is an explanatory diagram showing a display screen which performs a scroll display of three enlarged face image areas so as to overlap the picked-up image.

For example, when three face image areas F are displayed in the display screen in step S5 as shown in FIGS. 9A to 9C, the subjects of the three face image areas F are displayed by the scroll display so as to switch and all of the face image areas F are to be displayed so as to be displayed in the order of FIG. 9A, FIG. 9B, and FIG. 9C when the CPU 71 executes the scroll display control program 72l.

In such way, all the face image areas can be displayed even when the display area for the face image areas is small. Further, it can be switched so as to selectively display the face image area of the person desired by a user.

Here, the scroll may be carried out manually or may be automatically scrolled every predetermined time.

The ranking of a plurality of face image areas by a specific condition in step S4 is not limited to the ranking by the facial expression (for example, smile) of each face image area, and the ranking may be by the contrast of the face image areas, the brightness of the face image areas, the size of the face image areas or the like. By switching the specific condition to the condition which is desired by a user, the photographing of the subject in which the specific condition desired by a user is set as the main photographing condition can be carried out.

Moreover, when a plurality of face image areas are displayed in the order of ranking in step S5, the CPU 71 may select the predetermined number of face image areas among the detected plurality of face image areas by executing the face image area selection program 72e in the program memory 72 and may enlarge and display the selected face image areas. Then, for example, when the number of detected face image areas is more than the number of face image areas which can be displayed in the image display unit 32 of the display unit 3, five face image areas which can be displayed in the display unit 3 may be selected or the tope five face image areas in the raking by the specific condition (for example, in the order of facial expression which is smile) may be selected.

Figure 10:
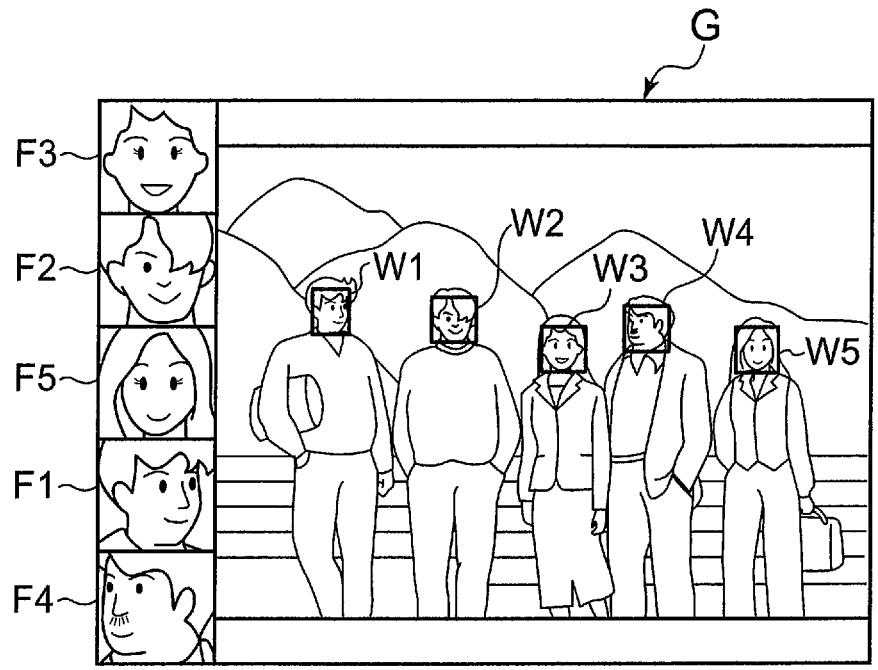
FIG. 10 is an explanatory diagram showing a modification example in which the face image areas and the picked-up image are displayed on the same screen so as not to overlap one another.

Further, a plurality of face image areas which are enlarged and the picked-up image are displayed so as to overlap one another. However, the display method of the face image areas and the picked-up image is not limited to this. For example, the face image areas F and the picked-up image G may be displayed so as not to overlap one another by reducing the size of the picked-up image portion and display the image as shown in FIG. 10. In such way, both the picked-up image G and the face image areas F can be visually confirmed preferably because the picked-up image G is not blocked by the face image areas F, and the photographing can be carried out while confirming the both.

Figure 11:
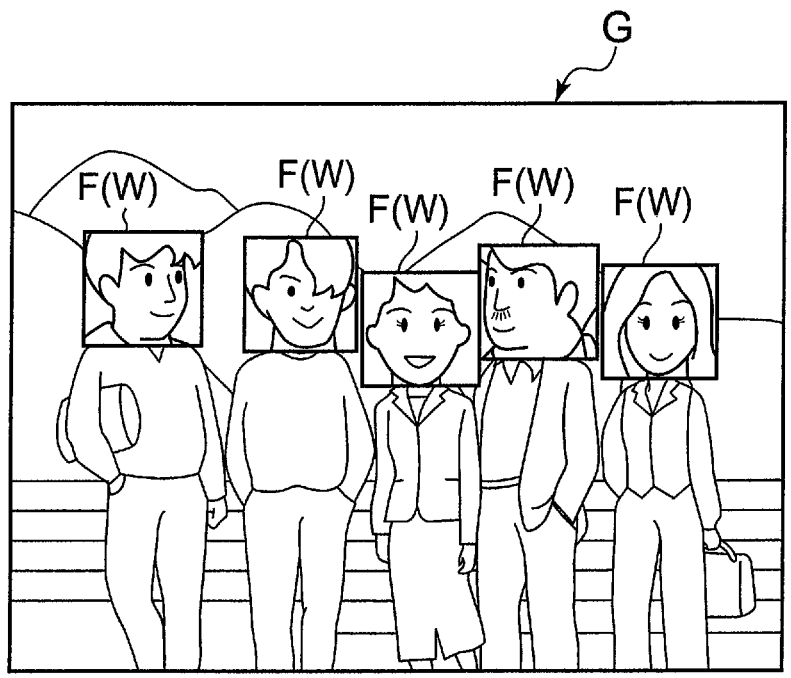
FIG. 11 is an explanatory diagram showing a modification example in which the face image areas are displayed by being superimposed onto the subjects.

Furthermore, a plurality of face image areas are arranged and displayed at the edge of the display screen. However, the display position of the face image areas is not limited to this. For example, the face image areas F may be displayed by being superimposed onto the face portion so as to correspond with the face which is the predetermined position of the subject in the picked-up image G as shown in FIG. 11. In such way, the facial expression and the line of sight of the person can be confirmed easily by the face image areas F corresponding with the subject person in the picked-up image G.

Here, when the face image areas F are displayed by being superimposed onto the face portion of the subject, it is preferable to shift the display position or to adjust the scale of enlargement of the face image areas F so that the adjacent face image areas F do not overlap one another.

Moreover, for example, the face-authentication function can be installed in the image pickup apparatus 100, and the face image areas may be displayed in the order of higher priority by carrying out the evaluation based on the priority order of the authenticated face images.

Figure 12:
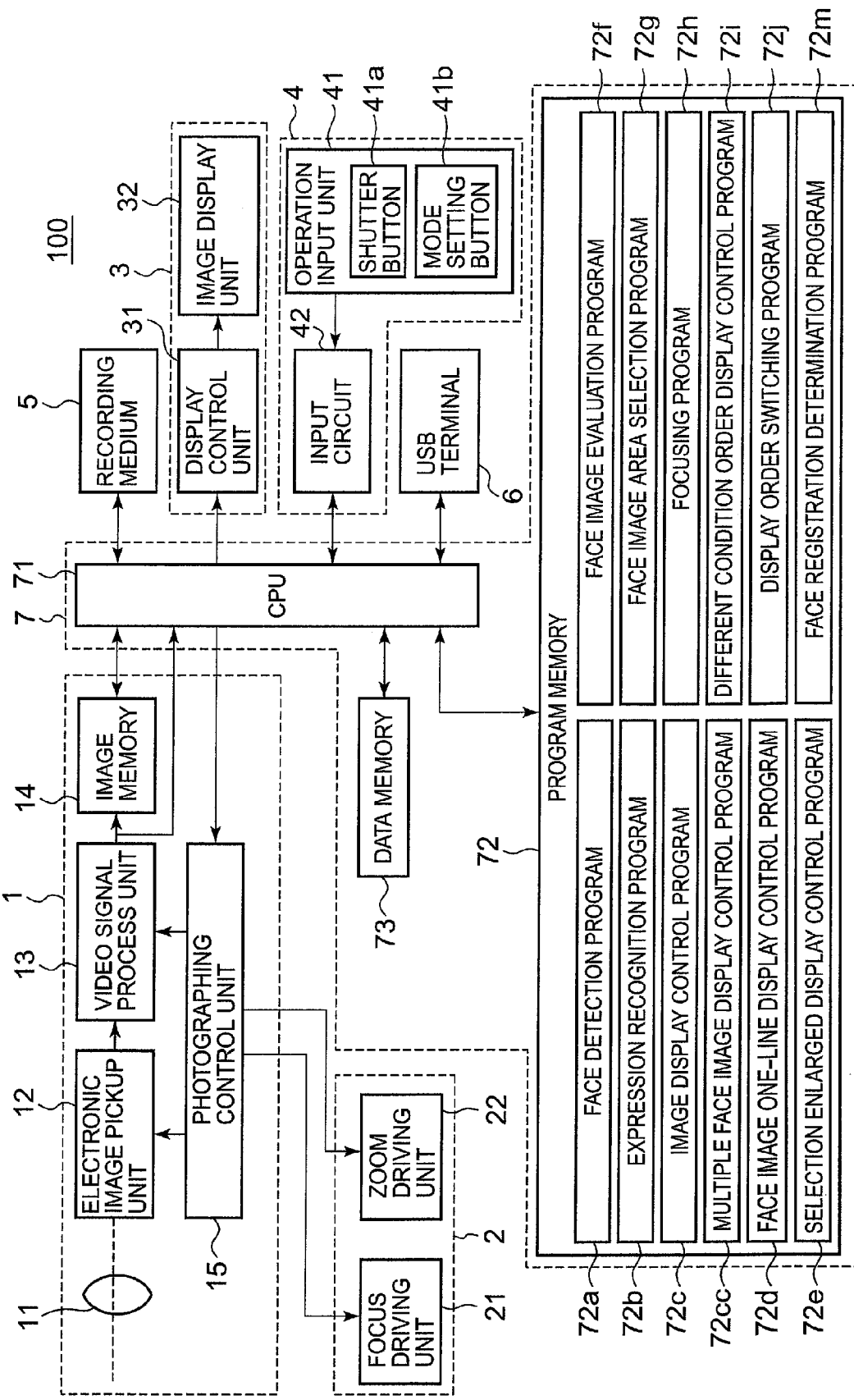
FIG. 12 is a block diagram showing a modification example of the image pickup apparatus.

That is, as shown in FIGS. 12 and 13, the CPU 71 matches the face image of the face image area which is detected in the face detection process to the face image which is registered in the face image registration table T (see FIG. 13) by executing the face registration determination program 72k in the program memory 72, and carries out the face-authentication process to determine (authenticate) whether the face images match or not. When the CPU 71 determines that the detected face image match to the face image which is registered in the face image registration table T as a result of the determination, the CPU 71 authenticates the person of the detected face image by the face detection process.

Then, the CPU 71 executes the face image evaluation program 72f and carries out the evaluation based on the priority order of the face images. Subsequently, the CPU 71 executes the image display control program 72c and displays the face image areas in the display unit 3 in the order of higher priority.

Here, the face image registration table T is stored in the program memory 72 (omitted from the drawing). Particularly, the face image registration table T registers the registration name, the priority level and the face image data in the order so as to be corresponded to one another as shown in FIG. 13. For example, when explaining the registration number 1 as an example, the face image registration table T stores the registration name "father", the priority level "1" and the face image data "N0001. jpg" so as to be corresponded to one another. Similarly, the registration name "mother", the priority level "1" and the face image data "N0002. jpg" are corresponded to one another in the registration number 2. Further, the registration name "brother", the priority level "2" and the face image data "N0003. jpg" are corresponded to one another in the registration number 3, the registration name "sister" and the face image data "N0004. jpg" are corresponded to one another in the registration number 4, and the registration name "grand father", the priority level "3" and the face image data "N0005. jpg" are corresponded to one another in the registration number 5.

Here, the face image registration table T shown in FIG. 13 is an example, and the face image registration table T is not limited to this. The registration name, the priority level, content of the face image data and the like can be arbitrarily changed.

When the CPU 71 detects the face image areas which corresponds to a plurality of persons in the face detection process and when the CPU 71 determines that the face images are registered in the face image registration table T (for example, when the face images of "mother", "brother" and "grand father" are registered), the CPU 71 arranges the face images among the face images registered in the face image registration table T in one vertical line in the order of higher priority level from top down (for example, in the order of the face image of "mother" (see face image area F3), the face image of "brother" (see face image area F2), the face image of "grand father" (see face image are F4)), and superimposedly display the face images in the display unit 3 so as to overlap a part of the picked-up image G.

Moreover, when the face image detected in the face detection process is registered in the face image registration table T but when the priority level of the face image is not registered (for example, the face image "sister" (see face image area F5)), the evaluation of the face image is low comparing to the face images in which the priority level is registered, and the face image may be displayed after (below) the face images in which the priority level is registered.

Further, when the CPU 71 determines that the face image which is detected in the face detection process is not registered in the face image registration table T by the face-authentication process, the evaluation of the face image of the unauthenticated face image area is low comparing to the authenticated face images, and the face image of the unauthenticated face image area may be displayed after (below) the face image in which the priority level is the lowest among the face images in which the priority level is registered (for example, the face image of "grand father" (see face image area F4)) or may be displayed after (below) the face image in which the priority level is not registered (for example, the face image of "sister" (see face image area F5)).

Figure 14:
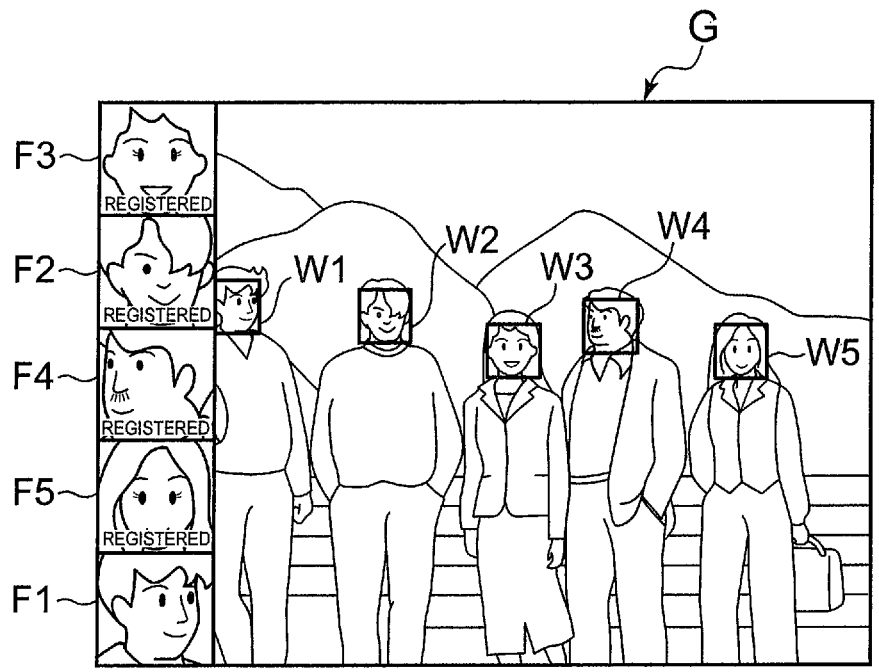
FIG. 14 is an explanatory diagram showing a display screen displaying the face image areas in which a facial authentication is carried out.

When the face images of the face image areas of the persons who are face-authenticated (for example, the face image of "mother" (see face image are F3), the face image of "brother" (see face image area F2), the face image of "grand father" (see face image area F4), the face image of "sister" (see face image area F5) and the like) are to be displayed, a display indicating that the face image is face-authenticated (for example, "registered" or the like) may be displayed so as to superimpose onto the face image (see FIG. 14).

Figure 15:
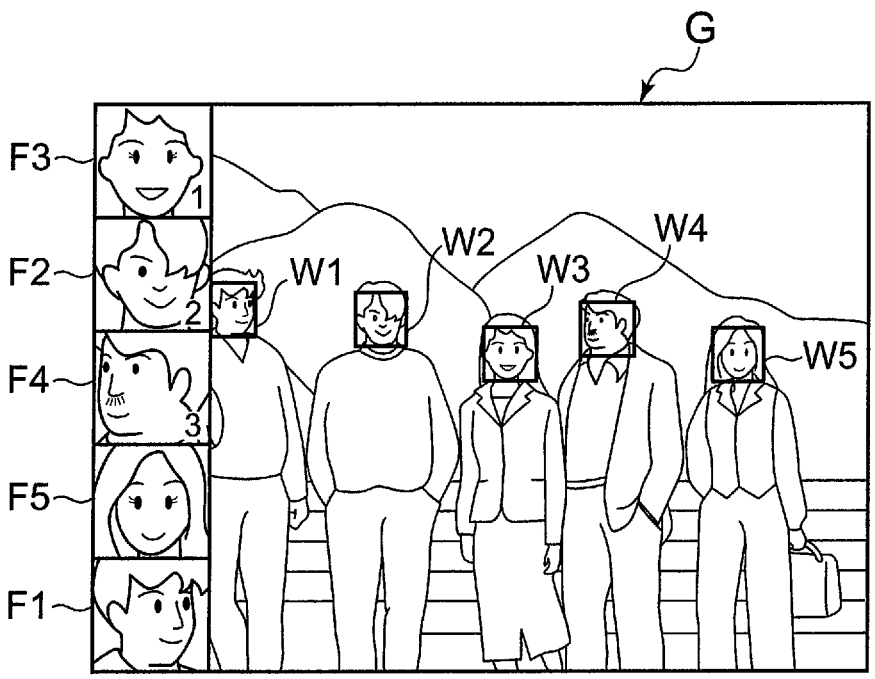
FIG. 15 is an explanatory diagram showing a display screen displaying the face image areas in which priority levels are registered.

In the case of the face images in which the priority level is registered among the face-authenticated face images (for example, the face image of "mother" (see face image area F3), the face image of "brother" (see face image area F2), the face image of "grand father" (see face image area F4) and the like), a display indicating the priority level of the face image (for example, "number" or the like according to the priority level) may be displayed so as to superimpose onto the face image (see FIG. 15).

Further, the display indicating the priority level may be displayed simultaneously along with the above described display indicating that the face image is face-authenticated.

Furthermore, the display indicating that the face image is face-authenticated and the display indicating the priority level may be displayed along with any one of the enlarged images of FIGS. 7, 9, 10 and 11 so as to superimpose.

The subject person who is to be focused in step S6 does not necessarily have to be the person who corresponds to the face image area in which the expression, smile is determined to be the best in the expression recognition. For example, he/she may be a person who corresponds to the face image area in which the specific condition such as the contrast, the brightness, the size or the like of the face image area is determined to be the best. Further, the specific condition can be selectively set, and can be switches to the condition desired by a user.

Moreover, the focus may be on the person who is more in the center of the screen in the picked-up image G or on the person in which the face image area have obtained an evaluation of more than or equal to the standard when evaluated by the specific condition and who is more in the center of the screen.

In the above embodiment, the timing of displaying the picked-up image and the enlarged display of the face image of the face area which is detected in the face detection process is set to the timing when both the through image and the REC view image are displayed in the display unit 3. However, the timing is not limited to this, and the timing may be set to the timing when at least one of the images among the through image and the REC view image is displayed. That is, the display of the picked-up image and the enlarged display of the face image of the face area which is detected in the face detection process may be carried out only when the through image is to be displayed in the display unit 3, and the display of the picked-up image and the enlarged display of the face image of the face area which is detected in the face detection process may be carried out only when the REC view image is to be displayed.

Moreover, the display method of the present invention in which the picked-up image and the enlarged image of the face image area are displayed at the same time is not limited to be carried out at the photographing time, and the above display method may be used for the image display when the photographed image is played in the play mode after the photographed image is recorded. In such way, the confirmation of the photographed image and the face image of the face area can be carried out more promptly even in the play mode.

Although it is needless to say, the enlarged image of the face image area according to the present invention may be only one, and a plurality of face image areas do not need to exist.

In the above described embodiment, the description is given by applying the present invention to the image pickup apparatus. However, the similar effect can be obtained and the expression of the subject person can be preferably confirmed when the face image display process of the present invention is applied to the image display apparatus which does not include an image pickup unit.

The present invention is not limited to the above embodiment, and various modifications and changes in the design can be carried out within the scope of the invention.

What is claimed is:

1. A display apparatus comprising:
    an image acquisition device which sequentially acquires a plurality of images;
    a face detection device which detects a plurality of face images based on at least one of the sequentially acquired plurality of images;
    a face image evaluation device which evaluates a specific condition for the plurality of face images detected by the face detection device, wherein the specific condition includes at least one of a facial expression, a facial contrast, a facial brightness, and a facial size;
    a selection device which selects a predetermined number of face images from among the plurality of face images detected by the face detection device, wherein a number of the selected predetermined number of face images is lower than a number of the plurality of face images detected by the face detection device, and wherein the selection device selects the predetermined number of face images based on the evaluation by the face image evaluation device; and
    an image display control device which controls a display device to simultaneously display a live-view image corresponding to the sequentially acquired plurality of images and the selected predetermined number of face images.

2. The display apparatus according to claim 1, wherein the selected predetermined number is a maximum number of face images displayable on the display device when the number of the detected face images is more than the maximum number of the face images displayable on the display device.

3. The display apparatus according to claim 1, wherein the selection device selects the predetermined number of face images in decreasing order of values according to the evaluation of the face images.

4. The display apparatus according to claim 1, wherein the image display control device controls the display device to display the predetermined number of the face images such that the predetermined number of the face images are superimposed onto a part of the live-view image.

5. The display apparatus according to claim 1, wherein the image display control device controls the display device to display the predetermined number of the face images such that the predetermined number of the face images are displayed on an edge of the live-view image.

6. The display apparatus according to claim 1, wherein the image display control device controls the display device to display the predetermined number of the face images so that the predetermined number of the face images are displayed in an enlarged form.

7. The display apparatus according to claim 1, wherein the image display control device controls the display device to display the predetermined number of the face images in an order of respective values according to the evaluation by the face image evaluation device.

8. The display apparatus according to claim 1, wherein the image display control device controls the display device to display the live-view image and the predetermined number of the face images such that the live-view image and the predetermined number of the face images do not overlap one another.

9. The display apparatus according to claim 1, further comprising an image pick-up device, wherein the image acquisition device sequentially acquires the plurality of images picked up by the image pick-up device.

10. An image display method for a display apparatus comprising a display device, the method comprising:
    sequentially acquiring a plurality of images;
    detecting a plurality of face images based on at least one of the sequentially acquired plurality of images;
    evaluating a specific condition for the detected plurality of face images, wherein the specific condition includes at least one of a facial expression, a facial contrast, a facial brightness, and a facial size;
    selecting a predetermined number of face images from among the detected plurality of face images, wherein a number of the selected predetermined number of face images is lower than a number of the detected plurality of face images, and wherein the predetermined number of face images are selected based on the evaluation of the specific condition; and
    controlling the display device to simultaneously display a live-view image corresponding to the sequentially acquired plurality of images and the selected predetermined number of face images.

* * * * *